US012510882B2

(12) United States Patent
Wang et al.

(10) Patent No.: US 12,510,882 B2
(45) Date of Patent: Dec. 30, 2025

(54) METHOD FOR CONTROLLING A PLURALITY OF EXECUTION MECHANISMS, ELECTRONIC DEVICE, AND STORAGE MEDIUM

(71) Applicant: Siemens Aktiengesellschaft, Munich (DE)

(72) Inventors: Zi Jian Wang, Beijing (CN); Wen Feng Liu, Beijing (CN); Shun Jie Fan, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 344 days.

(21) Appl. No.: 18/002,907

(22) PCT Filed: Jun. 24, 2020

(86) PCT No.: PCT/CN2020/098141
§ 371 (c)(1),
(2) Date: Dec. 22, 2022

(87) PCT Pub. No.: WO2021/258338
PCT Pub. Date: Dec. 30, 2021

(65) Prior Publication Data
US 2023/0259100 A1 Aug. 17, 2023

(51) Int. Cl.
*G05B 19/4155* (2006.01)
(52) U.S. Cl.
CPC ............ *G05B 19/4155* (2013.01); *G05B 2219/45104* (2013.01)
(58) Field of Classification Search
None
See application file for complete search history.

(56) References Cited

U.S. PATENT DOCUMENTS

| | | | |
|---|---|---|---|
| 4,402,053 A | 8/1983 | Kelley | 364/513 |
| 5,254,923 A | 10/1993 | Kanitani et al. | 318/568.11 |

(Continued)

FOREIGN PATENT DOCUMENTS

| | | | |
|---|---|---|---|
| CN | 105 073 349 | 11/2015 | B25J 13/00 |
| CN | 107 015 535 | 8/2017 | G05B 19/418 |

(Continued)

OTHER PUBLICATIONS

Search Report for International Application No. PCT/CN2020/098141, 4 pages, Jan. 29, 2021.

(Continued)

*Primary Examiner* — Sean Shechtman
(74) *Attorney, Agent, or Firm* — Slayden Grubert Beard PLLC

(57) ABSTRACT

Various embodiments of the teachings herein include a method for controlling a plurality of execution mechanisms. The method may include: determining a dependency relationship of synchronous motions among the plurality of execution mechanisms, wherein the dependency relationship represents motions of a second group of execution mechanisms in the plurality of execution mechanisms depending on motions of a first group of execution mechanisms in the plurality of execution mechanisms; determining an execution order of the first group of execution mechanisms and the second group of execution mechanisms according to the dependency relationship; determining rotation angles of joints coupled to corresponding execution mechanisms; and sequentially controlling the joints to respectively rotate by the determined rotation angles according to the determined execution order.

12 Claims, 5 Drawing Sheets

(56) References Cited

U.S. PATENT DOCUMENTS

2004/0128022 A1  7/2004 Fujibayashi ................. 700/213
2016/0023355 A1  1/2016 Komatsu .................... B25J 9/16

FOREIGN PATENT DOCUMENTS

| CN | 107486858   | * 12/2017 |                   |
|----|-------------|-----------|-------------------|
| CN | 107486858 A | 12/2017   | ............... B25J 9/16 |
| CN | 108 890 184 | 11/2018   | ............ B23K 37/00 |
| CN | 110 161 972 | 8/2019    | ........... G05B 19/414 |

OTHER PUBLICATIONS

Extended European Search Report, Application No. 20942280.7, 8 pages, Jan. 31, 2024.

* cited by examiner

METHOD FOR CONTROLLING A PLURALITY OF EXECUTION MECHANISMS, ELECTRONIC DEVICE, AND STORAGE MEDIUM

CROSS-REFERENCE TO RELATED APPLICATIONS

This application is a U.S. National Stage Application of International Application No. PCT/CN2020/098141 filed Jun. 24, 2020, which designates the United States of America, the contents of which are hereby incorporated by reference in their entirety.

TECHNICAL FIELD

The present disclosure relates to the field of industrial automation. Various embodiments of the teachings herein include methods and/or systems for controlling a plurality of execution mechanisms to perform synchronous motions.

BACKGROUND

Synchronous motions of a plurality of execution mechanisms are widely applied in the industrial fields, and execution mechanisms, such as robots and positioners, may be used to complete tasks such as welding or grasping workpieces. In practical application scenarios, multiple execution mechanisms often need to work with each other to complete a task. Motions of these execution mechanisms check each other while functioning in concert, and how to rationally and effectively control a sequence of motions among multiple execution mechanisms has presented difficult challenges to designers.

In addition, as tasks become more and more complicated, the completion of a task requires synchronization and coordination of more execution mechanisms. Therefore, there is an urgent need for an improved solution to controlling motions of execution mechanisms, thereby allowing multiple execution mechanisms with a complex dependency relationship to perform coordinated motions.

Some methods have been proposed for the control of a plurality of execution mechanisms to perform synchronous motions. For example, Chinese patent CN 1990196B proposes a mapping table, which reflects a linear mapping relationship between positions or speeds of two execution mechanisms. When a displacement of an execution mechanism occurs, the motion interpolation value of the execution mechanism is inputted into the mapping table to calculate the expected interpolation value of an execution mechanism related to the execution mechanism. This method allows two execution mechanisms to perform synchronous motions. However, once the number of execution mechanisms is increased to, for example, more than two, the synchronous dependency relationship among these execution mechanisms will become more complex. It is difficult to achieve synchronization control with such a mapping table in a complex situation.

In another example, with some solutions, synchronous data, such as motion interpolation values, are exchanged among all the execution mechanisms according to a synchronization dependency relationship. Data interaction may be realized by communication or a public data center. Upon receiving interpolation values of an execution mechanism, other related execution mechanisms can calculate their interpolation values. However, this method is mainly intended for synchronous operations among a plurality of operating mechanisms controlled by a distributed control system, and cannot achieve a desired effect in a centralized control system.

SUMMARY

To at least partially solve one or more of the above-mentioned problems and other potential problems, some embodiments of the present disclosure include methods for controlling synchronous motions among a plurality of execution mechanisms, electronic devices, and/or storage media. Embodiments of the present disclosure may be applied to a plurality of execution mechanisms with complex dependency relationships. In addition, embodiments of the present disclosure may also be applied to a distributed or centralized control system.

For example, some embodiments of the teachings herein include a method for controlling a plurality of execution mechanisms, comprising: determining a dependency relationship of synchronous motions among the plurality of execution mechanisms, wherein the dependency relationship represents that motions of a second group of execution mechanisms in the plurality of execution mechanisms depend on motions of a first group of execution mechanisms in the plurality of execution mechanisms; according to the dependency relationship, determining an execution order of the first group of execution mechanisms and the second group of execution mechanisms; determining the degrees of rotation angles of joints coupled to corresponding execution mechanisms; and according to the determined execution order, sequentially controlling the joints to respectively rotate by the determined degrees of rotation angles.

In some embodiments, determining the degrees of rotation angles of the joints comprises: determining execution paths of the corresponding execution mechanisms according to the dependency relationship; and determining the degrees of rotation angles of the joints according to the determined execution paths.

In some embodiments, the dependency relationship among the plurality of execution mechanisms is dynamically represented by a tree data structure, and determining the dependency relationship comprises: in response to the determination that a node associated with the first group of execution mechanisms is the parent node of nodes associated with the second group of execution mechanisms, determining that motions of the second group of execution mechanisms depend on motions of the first group of execution mechanisms.

In some embodiments, the first group of execution mechanisms comprises a positioner (10), the positioner (10) being configured to clamp a first workpiece (12); and the second group of execution mechanisms comprises: a first execution mechanism (20) configured to clamp a second workpiece (22), and a second execution mechanism (30) configured to clamp a welding gun (32), so as to weld the first workpiece (12) to the second workpiece (22) by the welding gun (32).

In some embodiments, determining the dependency relationship comprises: creating a reference coordinate system on the first workpiece (12); in response to the determination that the positioner (10) is fixed relative to the reference coordinate system and in response to the determination that the first execution mechanism (20) and the second execution mechanism (30) perform a linear motion relative to the positioner (10), determining that the motions of the first execution mechanism (20) and the second execution mechanism (30) depend on the motion of the positioner (10).

In some embodiments, the method further comprises receiving a command from a teach pendant or a programmable controller, and, according to the received command, determining a dependency relationship among a plurality of execution mechanisms.

In some embodiments, the method further comprises: determining the degree of rotation angle of another joint coupled to another of said execution mechanisms; and according to the execution order, controlling said another joint to rotate by the determined degree of rotation angle.

As another example, some embodiments include an electronic device (500) comprising: a processor (501); and a memory coupled to the processor (501), the memory having an instruction stored therein that, when executed by the processor (501), causes the electronic device (500) to perform actions, the actions comprising: determining a dependency relationship of synchronous motions among a plurality of execution mechanisms, wherein the dependency relationship represents that motions of a second group of execution mechanisms in the plurality of execution mechanisms depend on motion of a first group of execution mechanisms in the plurality of execution mechanisms; according to the dependency relationship, determining an execution order of the first group of execution mechanisms and the second group of execution mechanisms; determining the degrees of rotation angles of joints coupled to corresponding execution mechanisms; and according to the determined execution order, sequentially controlling the joints to respectively rotate by the determined degrees of rotation angles.

In some embodiments, determining the degrees of rotation angles of the joints comprises: determining execution paths of the corresponding execution mechanisms according to the dependency relationship; and determining the degrees of rotation angles of the joints according to the determined execution paths.

In some embodiments, the dependency relationship among the plurality of execution mechanisms is dynamically represented by a tree data structure, and determining the dependency relationship comprises: in response to the determination that a node associated with the first group of execution mechanisms is the parent node of nodes associated with the second group of execution mechanisms, determining that motions of the second group of execution mechanisms depend on motions of the first group of execution mechanisms.

In some embodiments, the first group of execution mechanisms comprises a positioner (10), the positioner (10) being configured to clamp a first workpiece (12); and the second group of execution mechanisms comprises: a first execution mechanism (20) configured to clamp a second workpiece (22), and a second execution mechanism (30) configured to clamp a welding gun (32), so as to weld the first workpiece (12) to the second workpiece (22) by the welding gun (32).

In some embodiments, determining the dependency relationship comprises: creating a reference coordinate system on the first workpiece (12); in response to the determination that the positioner (10) is fixed relative to the reference coordinate system and in response to the determination that the first execution mechanism (20) and the second execution mechanism (30) perform a linear motion relative to the positioner (10), determining that the motions of the first execution mechanism (20) and the second execution mechanism (30) depend on the motion of the positioner (10).

In some embodiments, the actions further comprise receiving a command from a teach pendant or a programmable controller, and, according to the received command, determining a dependency relationship among a plurality of execution mechanisms.

In some embodiments, the actions further comprise: determining the degree of rotation angle of another joint coupled to another of said execution mechanisms; and according to the execution order, controlling said another joint to rotate by the determined degree of rotation angle.

As another example, some embodiments include a computer-readable medium having a computer-executable instruction stored thereon that, when executed, causes at least one processor (501) to execute one or more of the methods described herein.

BRIEF DESCRIPTION OF THE DRAWINGS

The above-described characteristics, technical features, advantages, and implementation mode of teachings of the present disclosure will be further explained below in a clear and easy-to-understand manner on the basis of a description of preferred embodiments and with reference to the drawings. In the drawings.

Figure 1:
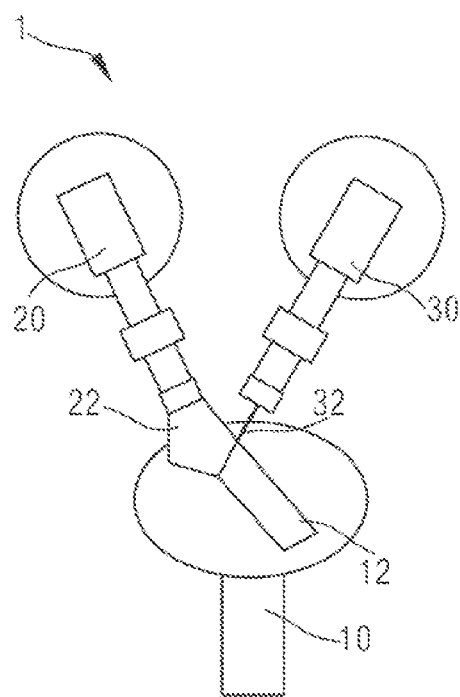
FIG. 1 is a schematic diagram of an environment in which an embodiment of the present disclosure may be implemented.

A list of the reference signs is as follows:
 1: Welding system;
 10: Positioner;
 12: First workpiece;
 20: First execution mechanism;
 22: Second workpiece;
 30: Second execution mechanism;
 32: Welding gun;
 301: Motion planning module;
 302: Dependency relationship analysis module;
 303: Motion interpolation management module;
 304: Motion interpolation execution module;
 305: Synchronous motion scheduling module;
 306: Dependency relationship agent module;
 401: Start;
 402: Create a reference coordinate system;
 404: Plan a motion of the positioner;
 406: Plan a motion of the first execution mechanism;
 408: Plan a motion of the second execution mechanism;
 411: Start;
 412: Establish a first dependency relationship;
 414: Establish a second dependency relationship;
 416: Schedule interpolation execution;
 418: Update dependency relationship status;
 420: Tree data structure;
 421: Start;
 422: Acquire the interpolation object of the Nth layer of the interpolation tree;
 424: Calculate the interpolation value;
 426: Acquire a reference coordinate system according to the dependency relationship;

428: Update the interpolation value according to the reference coordinate system;
429: Calculate joint positions by inverse kinematics;
500: Electronic device;
501: Processor;
502: ROM;
503: RAM;
504: Bus;
505: I/O interface;
506: Input unit;
507: Output unit;
508: Storage unit;
509: Communication unit.

DETAILED DESCRIPTION

Various principles of the present disclosure are described below with reference to several exemplary embodiments shown in the drawings. Although example embodiments of the present disclosure are shown in the drawings, it should be understood that these embodiments are only intended to enable those of ordinary skill in the art to better understand and implement the present disclosure, rather than limiting the scope of the present disclosure in any way.

The term "comprising" as used herein and variants thereof mean open inclusion, that is, "including but not limited to". The term "or" means "and/or" unless specially stated otherwise. The term "on the basis of" means "based at least in part on". The terms "one exemplary embodiment" and "one embodiment" mean "at least one exemplary embodiment". The term "another embodiment" means "at least one additional embodiment". The terms "first", "second", etc. may refer to different or identical objects. Other explicit and implicit definitions may also be included below.

As mentioned above, in an existing solution for synchronization control of execution mechanisms, because the application scenario is relatively simple, it is not considered how to extend the application scope of the synchronization control method to a complex scenario involving more execution mechanisms.

A use environment in which methods incorporating teachings of the present disclosure may be implemented will be described in detail below with reference to FIG. 1. As shown in FIG. 1, the first workpiece 12 is fixed on the positioner 10 and rotates with the positioner 10. The first execution mechanism 20 is configured to clamp the second workpiece 22, and the welding gun 32 is coupled to the second execution mechanism 30 to weld the first workpiece 12 and the second workpiece 22 together along with the motion of the second execution mechanism 30. In this embodiment, the first execution mechanism 20 may be a first robot (mechanical arm), the end of which clamps the second workpiece 22; the second execution mechanism 30 may be a second robot (mechanical arm), the end of which is provided with a welding gun 32.

In this scenario, it is necessary to keep the second workpiece 22 clamped by the first execution mechanism 20 relatively motionless with respect to the first workpiece 12 fixed on the positioner 10, while the positioner 10 itself keeps rotating. Thus, the first workpiece 12 remains in close contact with the surface to be welded of the second workpiece 22. In addition, the second execution mechanism 30 should also control the welding gun 32 to perform a linear motion when performing a welding task, so that the welding gun 32 may be aligned with the surface to be welded and the weld seam may remain a straight line, which ensures that the weld is accurate and neat.

Figure 2:
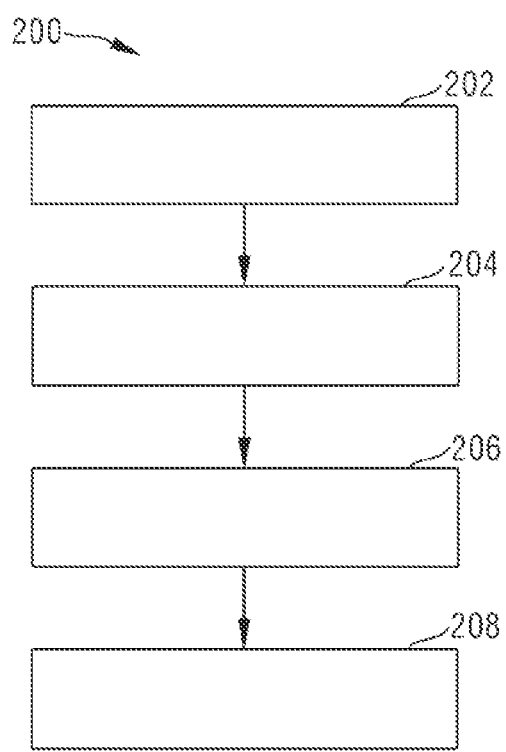
FIG. 2 is a flowchart of a process for controlling a plurality of execution mechanisms incorporating teachings of the present disclosure.

FIG. 2 is a flowchart of a process 200 for controlling a plurality of execution mechanisms incorporating teachings of the present disclosure. It should be understood that process 200 may be applied to the welding system 1 shown in FIG. 1. Of course, the process 200 may also be applied to various other systems that require synchronous control of execution mechanisms besides welding. For ease of discussion, the process 200 will be described by referring to FIG. 1.

At block 202, a dependency relationship of synchronous motions among a plurality of execution mechanisms is determined, wherein the dependency relationship represents that the motions of a second group of execution mechanisms in the plurality of execution mechanisms depend on the motions of a first group of execution mechanisms in the plurality of execution mechanisms.

In the above-mentioned scenario, a user inputs code instructions, and the controller analyzes the inputted code instructions to analyze a dependency relationship among the positioner 10, the first execution mechanism 20, and the second execution mechanism 30. In some embodiments, these code instructions may be instructions that specify the motion modes of the positioner 10, the first execution mechanism 20, and the second execution mechanism 30. In some embodiments, a dependency relationship is determinable by spatial positions of the positioner 10, the first execution mechanism 20, and the second execution mechanism 30. For example, in some embodiments, a code instruction may comprise an instruction to create a reference coordinate system, so that the spatial positions of a plurality of execution mechanisms are associable with one another by the reference coordinate system.

In some embodiments, only one central controller is provided for coordinating motions of each execution mechanism. This is called a centralized control system. In some other embodiments, each execution mechanism may be coupled to a corresponding controller to synchronize motions of each execution mechanism by cooperation among the controllers. This is called a distributed control system.

In some embodiments, by automatically parsing different code instructions inputted by a user in different scenarios, the dependency relationship of synchronous motions among execution mechanisms in different scenarios may be analyzed, so that the dependency relationship of synchronous motions among execution mechanisms may be dynamically established.

Figure 4:
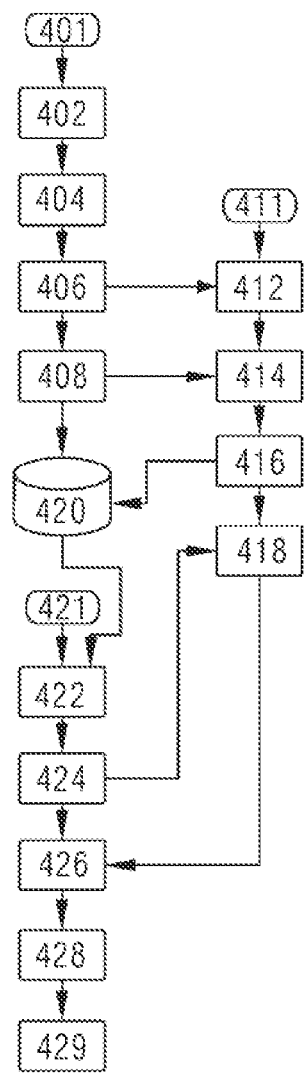
FIG. 4 is a workflow diagram applicable to the environment shown in FIG. 1.

Refer to FIG. 4, which is a workflow diagram applicable to the environment shown in FIG. 1. At block 402, a workpiece coordinate system is created. The workpiece coordinate system, different from the World Coordinate System, is created on specific parts in an actual use environment. In the scenario shown in FIG. 1, the workpiece coordinate system may be created on the first workpiece 12 fixed to the positioner 10. At block 404, the motion of the positioner 10 is planned according to the start position and end position of the positioner 10. At block 406, the motion of the first execution mechanism 20 is planned using the created workpiece coordinate system as the reference coordinate system. At block 408, the motion of the second execution mechanism 30 is planned using the created workpiece coordinate system as the reference coordinate system.

In response to the determination that the position of the positioner 10 is fixed relative to the reference coordinate system, and in response to the determination that the second workpiece 22 clamped by the first execution mechanism 20 and the welding gun 32 on the second execution mechanism 30 perform a linear motion relative to the first workpiece 12 clamped by the positioner 10, it is determined that the motions of the first execution mechanism 20 and the second execution mechanism 30 depend on the motion of the positioner 10. It is thus clear that the positioner 10 should be classified as a group of execution mechanisms (for example, a first group of execution mechanisms), while the first execution mechanism 20 and the second execution mechanism 30 should be classified as a different group of execution mechanisms (for example, a second group of execution mechanisms).

It should be understood that the specific forms of motion listed herein depend on the use environments. For example, in some embodiments, since it is necessary to keep the second workpiece 22 clamped by the first execution mechanism 20 and the first workpiece 12 clamped by the positioner 10 motionless relative to each other, the end of the first execution mechanism 20 can perform a linear motion with zero displacement relative to the end of the positioner 10. Since the weld seam needs to be kept a straight line, the end of the second execution mechanism 30 performs a linear motion with non-zero displacement relative to the end of the positioner 10.

On the basis of the analysis results of the above dependency relationship, a tree data structure may be dynamically created to describe the dependency relationship of synchronous motions among a plurality of execution mechanisms. Referring to FIG. 4, a first synchronization dependency relationship between the positioner 10 and the first execution mechanism 20 is established at block 412. At block 414, a second synchronization dependency relationship between the positioner 10 and the second execution mechanism 30 is established. For example, after the above dependency relationship is determined, since the positioner 10 should be classified as one group of execution mechanisms, while the first execution mechanism 20 and the second execution mechanism 30 should be classified as another group of execution mechanisms, the controller associates the positioner 10 with the nodes in the tree data structure, and associates the first execution mechanism 20 and the second execution mechanism 30 with the child nodes of the nodes of the positioner 10. Thus, the tree data structure may be used to reflect a dependency relationship among a plurality of execution mechanisms, that is, representing that the motions of the first execution mechanism 20 and the second execution mechanism 30 depend on the motion of the positioner 10. Therefore, the motion mode of the second group of execution mechanisms composed of the first execution mechanism 20 and the second execution mechanism 30 is determinable based on the motion result of the first group of execution mechanisms composed of the positioner 10.

Since there is an association between a parent node and child nodes thereof in a tree data structure, but there is no association between the child nodes under the same parent node, such a data structure clearly reflects a relationship of the positioner 10 with the first execution mechanism 20 and the second execution mechanism 30, which means that the motions of the first execution mechanism 20 and the second execution mechanism 30 depends on the motion of the positioner 10, respectively, but there is no dependency relationship between the first execution mechanism 20 and the second execution mechanism 30.

In addition, since a tree data structure can expand as the number of node layers increases, such a data structure is suitable for complex dependency relationships. For example, in a scenario where the positioner 10 is installed on a conveyor belt, the motion of the positioner 10 depends on the motion of the conveyor belt, and the conveyor belt may be associated with the nodes of the first layer of the tree data structure, the positioner 10 may be associated with the nodes of the second layer of the tree data structure, and the first execution mechanism 20 and the second execution mechanism 30 may be associated with the nodes of the third layer of the tree data structure. Such a data structure clearly reflects a logical relationship among a plurality of execution mechanisms. Of course, the scenario of a conveyor belt demonstrated herein is only schematic. Embodiments of the present disclosure are applicable to other scenarios different from those demonstrated herein, as long as synchronous motions of a plurality of execution mechanisms are required in such scenarios.

In some embodiments, the tree data structure needs to be updated as a task is executed. Referring to FIG. 4, at block 416, the tree data structure is dynamically changed using updated synchronization dependency relationships. At block 418, the status of the dependency relationship, for example, the status of the workpiece coordinate system, is updated.

Figure 3:
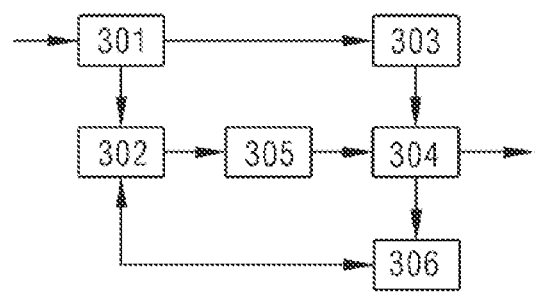
FIG. 3 is a schematic diagram of a system for controlling synchronous operations incorporating teachings of the present disclosure.

Refer to FIG. 3, which is a system for controlling synchronous operations of a plurality of execution mechanisms incorporating teachings of the present disclosure. The system comprises a synchronous motion management module. The synchronous motion management module analyzes a synchronous dependency relationship according to a motion command given by an execution mechanism.

As shown in FIG. 3, the synchronous motion management module may be composed of a dependency relationship analysis module 302, a synchronous motion scheduling module 305, and a dependency relationship agent module 306. In the dependency relationship analysis module 302, a dependency relationship of a synchronous motion among a plurality of execution mechanisms is analyzed according to a code. In the synchronous motion scheduling module 305, it is determined how a synchronization relationship among a plurality of execution mechanisms is scheduled, and an execution order of and a dependency relationship among a plurality of execution mechanisms may be continuously adjusted. During the control of an execution mechanism, a complex motion of the execution mechanism is usually divided into a plurality of tiny linear motions. The period of time corresponding to each tiny linear motion is the interpolation period. In general, the shorter the interpolation period is, the more finely the motion is divided, and the more accurate the motion of the execution mechanism thus obtained is.

Referring to FIG. 3, when the teachings are applied in a distributed control system described above, information on a synchronization dependency relationship will be shared among the distributed controllers through the dependency relationship agent module 306. In some embodiments, as indicated by the arrows in FIG. 3, information on a synchronization dependency relationship can include an analysis result of dependency relationship outputted by the dependency relationship analysis module 302, and an interpolation result of the positioner 10 analyzed by the motion interpolation execution module 304 during the interpolation period, that is, the distance that should be moved during the interpolation period. In other words, the dependency relationship agent module 306 can transmit an analysis result of a dependency relationship and the distance that the corresponding execution mechanism should move to other controllers in the distributed control system. Thus, the various embodiments may be run in various types of control systems including centralized and distributed control systems, thus expanding their scope of application. Of course, in a centralized control system with only one controller, such a dependency relationship agent module 306 is not required.

In some embodiments, the system may comprise a command receiving module. The command receiving module is used to receive motion commands for execution mechanisms. These motion commands may be received from programs generated by a teach pendant. These motion commands may also be received from application program interfaces. These application program interfaces may be referred to as programmable controllers. A dependency relationship among a plurality of execution mechanisms is determined according to a command received from a teach pendant or programmable controller.

Referring back to FIG. 2, at block 204, an execution order of the first group of execution mechanisms and the second group of execution mechanisms is determined according to the determined dependency relationship. At block 206, the degrees of rotation angles of the joints coupled to the corresponding execution mechanisms are determined.

In some embodiments, motions of execution mechanisms may be realized by controlling motions of the robot's joints respectively. Determining the degrees of rotation angles of joints may comprise: determining an execution path of the corresponding execution mechanisms according to the determined dependency relationship, and determining the degrees of rotation angles of the joints according to the determined execution path. For example, the control mode of the servo motor for joints may be calculated by the solving process of inverse kinematics, so that the execution mechanism moves following a predetermined path. Thus, the second workpiece 22 clamped by the first execution mechanism 20 may be made to have a close contact with the first workpiece 12 clamped by the positioner 10, and the second execution mechanism 30 can align the welding gun 32 to the welding position to achieve accurate welding.

Again referring to FIG. 4, at block 422, all the interpolation objects of a certain layer in the tree data structure are acquired. At block 424, for each interpolation object, the interpolation value under the reference coordinate system (for example, the position of the second execution mechanism 30 on the linear weld) is calculated, and the reference coordinate system status associated with each interpolation object (for example, the workpiece coordinate system created on the first workpiece 12 that is fixedly connected to the positioner 10) is updated with the interpolation motion. At block 426, the reference coordinate system on which the current interpolation object depends is acquired based on the dependency relationship (for example, the second execution mechanism 30 can, based on the dependency relationship, acquire the workpiece coordinate system created on the first workpiece 12 that is fixedly connected to the positioner 10). This reference coordinate system has been updated at higher levels in the tree data structure. At block 428, the interpolation value is updated based on the reference coordinate system, and the interpolation value in the World Coordinate System is calculated according to the coordinate transformation relationship. At block 429, positions of the joints are calculated by inverse kinematics. Positions of the joints are sent to each execution mechanism after being processed by joint motion controls.

As shown in FIG. 3, the control system further comprises a motion planning and execution module. The motion planning and execution module may be composed of a motion planning module 301, a motion interpolation management module 303, and a motion interpolation execution module 304. In the motion interpolation management module 303, the distance that each execution mechanism should move in the interpolation period is calculated for planning the motion of the execution mechanism based on a received motion command. Specifically, the motion planning and execution module can generate interpolation objects for each motion. The motion planning and execution module may further be configured to manage and execute interpolations and to control the joints of the execution mechanisms by generating set points of servo motors.

Referring back to FIG. 2, at block 208, according to the determined execution order, the joints are sequentially controlled to respectively rotate by the determined degrees of rotation angles. In some embodiments, the degrees of rotation angles of joints may be directly realized by controlling servo motors. Specifically, the degrees of rotation angles of joints of execution mechanisms can be controlled by generating set points of servo motors. In a centralized control system, there is only one controller, which can determine the degrees of rotation angles of joints in the system and control the corresponding joints to respectively rotate by corresponding degrees of rotation angles according to the determined execution mechanism. In a distributed control system, there are a plurality of controllers, each of which determines the degrees of rotation angles of joints of execution mechanisms associated therewith and controls the joints to rotate by the determined degrees of rotation angles.

The control system further comprises a communication module. The communication module sends out set points of servo motors, thereby driving the corresponding execution mechanisms to move. Meanwhile, the communication module also receives statuses of the servo motors (such as the actual motor position or motor speed) to update the statuses of the execution mechanisms.

In some embodiments, the dependency relationship described above may be established during the operation of a robot and cleared after the task is completed. Thus, embodiments according to the present disclosure may be implemented more flexibly.

In some embodiments, under the welding conditions shown in FIG. 1, a dependency relationship of the positioner 10 with the first execution mechanism 20 and the second execution mechanism 30 is reflected by a tree data structure, so that the motion of the positioner 10 is performed first by controlling the corresponding joints, and the position to which the positioner 10 moves at the next moment is calculated. Then, the first execution mechanism 20 and the second execution mechanism 30 calculate the position that should be reached in the next interpolation period according to an updated position of the positioner 10, so as to ensure accurate welding. Although some example embodiments are described using welding robots, teachings of the present disclosure may also be applied to other scenarios, such as picking up workpieces on a conveyor belt.

By associating each execution mechanism under actual working conditions with each node of the tree data structure, coordinated motions of execution mechanisms can be controlled by a hierarchical relationship of the tree data structure. Since the tree data structure is highly extensible, embodiments of the present disclosure may be extended to scenarios involving complex dependency relationships by progressively increasing the number of levels of the data structure, without causing a drastic increase in control complexity. In addition, embodiments of the present disclosure can be applied to various use scenarios of centralized control systems or distributed control systems.

Figure 5:
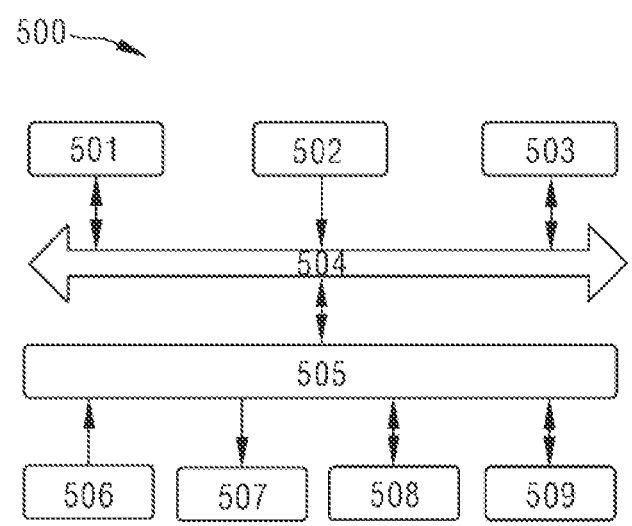
FIG. 5 is a block diagram of an exemplary device incorporating teachings of the present disclosure.

FIG. 5 is a schematic block diagram of an exemplary device 500 incorporating teachings of the present disclosure. The device 500 may be used to implement the process 200 show in FIG. 2.

As shown in the drawing, the device 500 comprises a processor 501, which may be a central processing unit (CPU) capable of performing various appropriate actions and processes according to computer program instructions stored in a read-only memory (ROM) 502 or computer program instructions loaded into a random-access memory (RAM) 503 from a storage unit 508. In the RAM 503, various programs and data required for the operation of the device 500 may also be stored. The processor 501, the ROM 502, and the RAM 503 are connected to one another via a bus 504. An input/output (I/O) interface 505 is also connected to the bus 504.

A plurality of components in the device 500 are connected to the I/O interface 505, which include: an input unit 506, for example, a keyboard or a mouse; an output unit 507, such as various types of displays or speakers; a storage unit 508, for example, a magnetic disk or an optical disc; and a communication unit 509, for example, a network adapter, a modem, or a wireless communication transceiver. The communication unit 509 allows the device 500 to exchange information/data with other devices through a computer network, for example, the Internet, and/or various telecommunication networks.

The processing unit 501 performs various methods and processes described above, for example, the process 200. For example, in some embodiments, the process 200 may be implemented as a computer software program or a computer program product, which is tangibly incorporated in a computer-readable medium, such as a non-transient computer-readable medium (for example, the storage unit 508). In some embodiments, part or all of a computer program may be loaded and/or installed on the device 500 via the ROM 502 and/or the communication unit 509. When a computer program is loaded into the RAM 503 and executed by the processor 501, one or more steps of the process 200 described above may be executed. Alternatively, in another embodiment, the processor 501 may be configured to execute the process 200 by any other suitable means (for example, by means of firmware).

Those of ordinary skill in the art should understand that each step of a method of the present disclosure may be realized by a general computing device, which may be integrated on a single computing device, or distributed on a network composed of a plurality of computing devices, wherein, optionally, they may be realized by program codes executable by a computing device, so that they may be stored in a storage device and executed by a computing device, or they may be made into individual integrated circuit modules, or a plurality of modules or steps among them may be made into a single integrated circuit module for implementation. Thus, the present disclosure is not limited to any specific combination of hardware and software. For example, some embodiments of the present disclosure further comprise various program modules and/or integrated circuit modules for performing one or more steps of the process 200 and/or one or more other steps described in other embodiments of the present disclosure. These program modules may be incorporated or embodied in a device, for example, the device 500 shown in FIG. 5.

It will be appreciated that although several apparatuses or sub-apparatuses of the equipment are mentioned in the above detailed description, this division is merely exemplary and not mandatory. In fact, according to embodiments of the present disclosure, features and functions of two or more apparatuses described above may be embodied in one apparatus. Conversely, features and functions of one apparatus described above may be further divided into a plurality of apparatuses for embodiment.

What have been described above are only optional embodiments of the present disclosure, rather than being intended to limit the present disclosure, and for those of ordinary skill in the art, the present disclosure may have various modifications and alterations. Any modifications, equivalent substitutions, improvements, etc. made without departing from the spirit or principle of the present disclosure shall fall within the protection scope of the present disclosure.

What is claimed is:

1. A method for controlling a plurality of execution mechanisms, the method comprising:
   determining a dependency relationship of synchronous motions among the plurality of execution mechanisms, wherein the dependency relationship represents motions of a second group of execution mechanisms in the plurality of execution mechanisms depending on motions of a first group of execution mechanisms in the plurality of execution mechanisms;
   determining an execution order of the first group of execution mechanisms and the second group of execution mechanisms according to the dependency relationship;
   determining rotation angles of joints coupled to corresponding execution mechanisms; and
   sequentially controlling the joints to respectively rotate by the determined rotation angles according to the determined execution order;
   wherein the dependency relationship among the plurality of execution mechanisms is dynamically represented by a tree data structure;
   wherein the first group of execution mechanisms comprises a positioner configured to clamp a first workpiece;
   wherein determining the dependency relationship comprises creating a reference coordinate system on the first workpiece;
   in response to the determination that the positioner is fixed relative to the reference coordinate system and that a first execution mechanism and a second execution mechanism perform a linear motion relative to the positioner, determining that the motions of the first execution mechanism and the second execution mechanism depend on the motion of the positioner.

2. A method according to claim 1, wherein determining the degrees of rotation angles of the joints comprises:
   determining execution paths of the corresponding execution mechanisms according to the dependency relationship; and
   determining the degrees of rotation angles of the joints according to the determined execution paths.

3. A method according to claim 1, wherein:
   determining the dependency relationship comprises, in response to the determination that a node associated with the first group of execution mechanisms is the parent node of nodes associated with the second group of execution mechanisms, determining that motions of the second group of execution mechanisms depend on motions of the first group of execution mechanisms.

4. A method according to claim 1, wherein the second group of execution mechanisms comprises: a first execution mechanism configured to clamp a second workpiece, and a second execution mechanism configured to clamp a welding gun, so as to weld the first workpiece to the second workpiece by the welding gun.

5. A method according to claim 1, further comprising:
receiving a command from a teach pendant or a programmable controller; and
determining a dependency relationship among a plurality of execution mechanisms according to the received command.

6. A method according to claim 1, further comprising:
determining the degree of rotation angle of another joint coupled to another of said execution mechanisms; and
according to the execution order, controlling said another joint to rotate by the determined degree of rotation angle.

7. An electronic device comprising:
a processor; and
a memory coupled to the processor, the memory storing an instruction that, when executed by the processor, causes the electronic device to:
determine a dependency relationship of synchronous motions among a plurality of execution mechanisms, wherein the dependency relationship represents that motions of a second group of execution mechanisms in the plurality of execution mechanisms depend on motion of a first group of execution mechanisms in the plurality of execution mechanisms;
according to the dependency relationship, determine an execution order of the first group of execution mechanisms and the second group of execution mechanisms;
determine the degrees of rotation angles of joints coupled to corresponding execution mechanisms; and
according to the determined execution order, sequentially control the joints to respectively rotate by the determined degrees of rotation angles;
wherein the dependency relationship among the plurality of execution mechanisms is dynamically represented by a tree data structure;
wherein the first group of execution mechanisms comprises a positioner configured to clamp a first workpiece;
wherein determining the dependency relationship comprises creating a reference coordinate system on the first workpiece;
in response to the determination that the positioner is fixed relative to the reference coordinate system and that a first execution mechanism and a second execution mechanism perform a linear motion relative to the positioner, determine that the motions of the first execution mechanism and the second execution mechanism depend on the motion of the positioner.

8. An electronic device according to claim 7, wherein determining the degrees of rotation angles of the joints comprises:
determining execution paths of the corresponding execution mechanisms according to the dependency relationship; and
determining the degrees of rotation angles of the joints according to the determined execution paths.

9. An electronic device according to claim 7, wherein determining the dependency relationship comprises: in response to the determination that a node associated with the first group of execution mechanisms is the parent node of nodes associated with the second group of execution mechanisms, determining that motions of the second group of execution mechanisms depend on motions of the first group of execution mechanisms.

10. An electronic device according to claim 7, wherein the second group of execution mechanisms comprises: a first execution mechanism configured to clamp a second workpiece, and a second execution mechanism configured to clamp a welding gun, so as to weld the first workpiece to the second workpiece by the welding gun.

11. An electronic device according to claim 7, wherein the actions further comprise:
receiving a command from a teach pendant or a programmable controller, and, according to the received command, determining a dependency relationship among a plurality of execution mechanisms.

12. An electronic device according to claim 7, wherein the actions further comprise:
determining the degree of rotation angle of another joint coupled to another of said execution mechanisms; and
according to the execution order, controlling said another joint to rotate by the determined degree of rotation angle.

* * * * *